Feb. 14, 1956 R. E. ZENNER 2,734,689

SOUND RECORDING APPARATUS

Filed Feb. 20, 1953

INVENTOR
RAYMOND E. ZENNER

BY George Lipkin
Paul V. Ruhlman Jr.
ATTORNEYS 2,734,689
Patented Feb. 14, 1956

2,734,689

SOUND RECORDING APPARATUS

Raymond E. Zenner, Hollywood, Ill., assignor, by mesne assignments, to the United States of America as represented by the Secretary of the Navy Application February 20, 1953, Serial No. 338,066

2 Claims. (Cl. 242—54)

Figure 1:
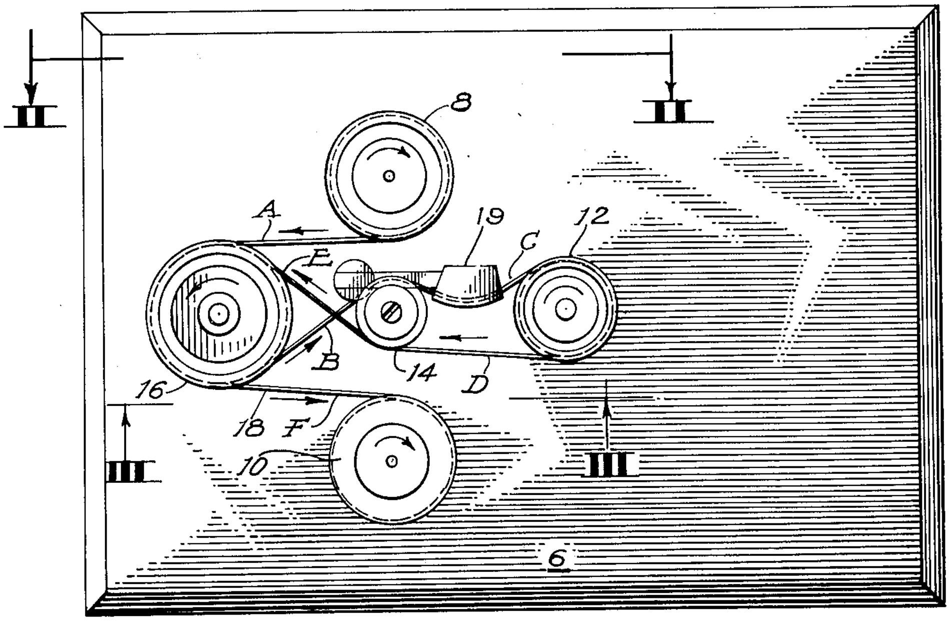

This invention relates to sound recording apparatus such as tape or wire recorders.

Efforts are constantly being made to improve sound recorders and, particularly, to increase the fidelity of their reproduction, as well as their compactness, size and operating convenience. Many different types of recording media have been devised and, of course, a great deal of work has been done on the actual recording heads so as to improve their operation. However, it also is recognized that there are certain mechanical difficulties that must be overcome in order to achieve maximum fidelity and that these difficulties may persist even through optimum material and circuit arrangements are devised. Thus, for instance, the drive systems for progressing the recording wire, or such other media as may be used, in a fixed path from a supply reel, past a recording head and onto a take-up reel, must be considered particularly with a view toward assuring that the speed of the wire is constant and that the directing of its travel is smooth and uniform, particularly as the wire is being passed through the recording head. Thus, for instance, one of the mechanical difficulties is that because of a level-wind mechanism, or the like, the wire sometimes does not proceed in precisely a smooth, straight line direction through the recording head but instead is caused to move in an undulating path transversely across the head with the result that undesirable noise interferences are set up. The undulating movement may be caused by the use of any reciprocating mechanism, such as a plural grooved level-wind spool adapted to be reciprocated to receive wire first at one level and then at another, or it may simply result from vibrations set up in the wire. Whatever the cause, even the slightest undulation of the wire with respect to the head is undesirable and seriously impairs the fidelity of the instrument.

It is, therefore, an object of the present invention to provide a path or drive for a recording medium which assures an absolute straight-line motion of the wire past the recording head.

Another object is to provide such a drive or path as will assure a constant wire or tape speed.

A more specific object is to provide a drive which incorporates a single level wind mechanism capable of use, both during recording or reproduction and during rewinding operations.

Other objects will become apparent from the accompanying drawings and ensuing description.

Briefly considered, the path provided by the present invention includes, in addition to the usual supply and take-up reels, a plural-grooved spool adapted first to receive the supply and then to pass it on to the take-up reel, as well as other spools which form the path to and from the recording head. As presently contemplated, this plural-grooved spool is a level-winding spool and, preferably, it is of a special type described and claimed in my copending U. S. patent application, Serial No. 338,067, filed February 20, 1953. Generally, this level-wind mechanism is a spool mounted on a cam-reciprocated shaft and adapted to be driven by the motion of the recording medium.

One of the features of the invention is the manner in which the slight undulating or oscillating motion produced by a level-wind spool is smoothed out or eliminated so as to assure an unvarying straight line motion in the recording medium as it traverses the recording head. To accomplish this purpose, an idler spool is disposed between the plural-grooved, level-wind spool and the recording head, this idler being provided with a single groove that is aligned with the pass through the recording head, so that the extent of wire or tape between the idler and the head lies in an unvarying straight line. Also, the idler is so positioned that the recording medium passing from the level-wind spool to the head is engaged by a limited arcuate extent of the circumference of this groove, and, in addition, the recording medium returning from the recording head is engaged by another limited arcuate extent of this groove's circumference. Most suitably, another spool is utilized to receive the recording medium after it has passed the recording head and before it is returned to the idler, and this other spool also is provided with a groove that is aligned with the pass-through recording head. Preferably, this other spool is a capstan which provides a constant drive for the recording medium. Although the present invention could conceivably be practiced with a recording medium made of tape, it is believed to be particularly suitable for use with a wire recording medium.

Figure 2:
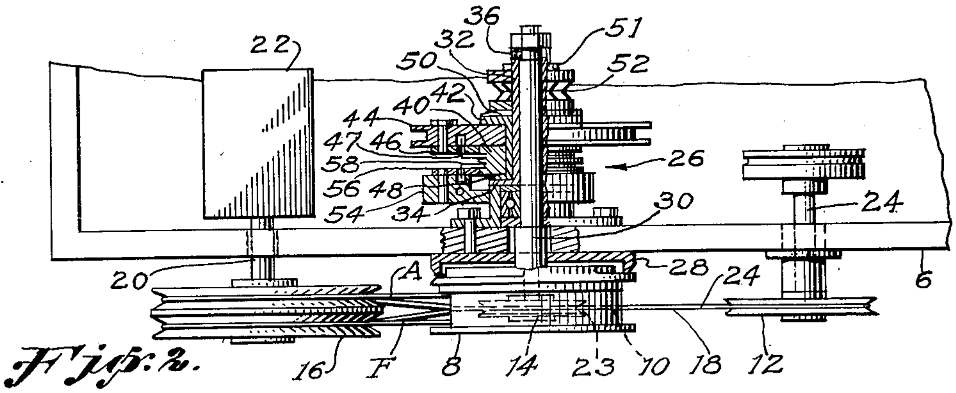

Referring to the drawings, Fig. 1 is a face view of a portion of a sound recorder panel arranged in accordance with the teachings of this invention; Fig. 2, a section taken along lines II—II of Fig. 1, and Fig. 3, a section along lines III—III of Fig. 1, illustrating schematically the relative positions of certain spools to produce a straight-line motion in the recording medium.

Referring to the drawings, the sound recorder and its associated electrical equipment (not shown) may be of any conventional type having a front panel 6 on which are supported in spaced relationship, supply and take-up reels or spools 8 and 10, as well as spools 12, 14 and 16, all of which rotatably support a recording medium or wire 18, threaded in a particular manner to be described. The recording medium may be the conventional stainless steel wire, although it is obvious that other wires or other elongate flexible materials such as plastics could be used. Generally, the recording medium passes in a forward or recording operation from a supply reel 8 to a take-up reel 10, via certain intermediate spools which are rotated in a direction as illustrated by arrows in Fig. 1. During rewinding the path, of course, and the rotation of the spools, is reversed.

The particular path of the recording medium is an important feature of this invention as it enables the wire to be driven at a constant speed under a uniform and controlled tension, eliminating slippage of the recording medium, and providing an unvarying course as it travels past the recording head 19. Referring to Fig. 1, the recording medium follows a course from the bottom of the supply reel 8 along leg A to the top of and around the inner sheave of the double-sheaved spool 16, then along leg B to the top of single sheave spool 14. From spool 14 the wire proceeds in a horizontal leg C beneath recording head 19 to the top of and around a third spool 12, from which it follows along a horizontal leg D to the bottom of spool 14, and finally along leg E around the outer sheave of spool 16 and along leg F to take-up reel 10. Recording head 19 is pivotally mounted on the panel and, in recording position (Fig. 1) bears against the horizontal leg C of the path.

The shafts forming the rotational axes of all spools are mounted on panel 6 in a parallel, spaced relationship which, in association with the above path, provides lateral clearance between elements for the threading of the recording medium by the operator from a position in front of the recorder. Thus, the recording medium can be applied to the recorder drive in a simple and continuous motion without need for stopping to change hands during the threading operation.

The recording medium is driven from one spool to the other by spool 12 which, preferably, is driven as a capstan through a conventional drive connection. As the capstan engages the recording medium once throughout the path only a single V-shaped groove in the capstan is provided. Although a capstan drive is preferred, the recording medium may, if desired, be driven through the spool shafts in other manners known in the art.

Another important feature of this invention resides in the use of spool 16 as a level wind mechanism which is driven by the recording medium to wind the medium in smooth and level consecutive layers on both supply and take-up spools. Only one level wind pulley is necessary in this invention because the novel path is arranged with the supply and take-up spools closely situated, and the level wind spool is supported at an intermediate and offset position from these spools where it may serve equally both spools when operated in either direction. With respect to this arrangement, it will be noted that the capstan is arranged to be similarly offset as the level wind pulley but on the opposite side of the spool 14, this resulting in a compact and balanced path. The use of a level wind spool in the path enables the recording medium to be firmly supported as it is wound, and, what is more important, provides a means by which the recording medium through frictional engagement drives a self-contained level wind mechanism 22 for imparting the necessary reciprocatory movement to the recording medium. The details of level wind mechanism 22 are adequately described in my above identified patent application, the only presently important feature being that its required reciprocatory motion is derived from a rotary drive imparted by the continuous travel of the wire. Such being the case, this single level wind spool can be used in the present recording path both in winding and rewinding operations; a fact which not only assists materially in compactness and size reduction, but in addition, permits the employment of the remaining elements of the path.

Figure 3:
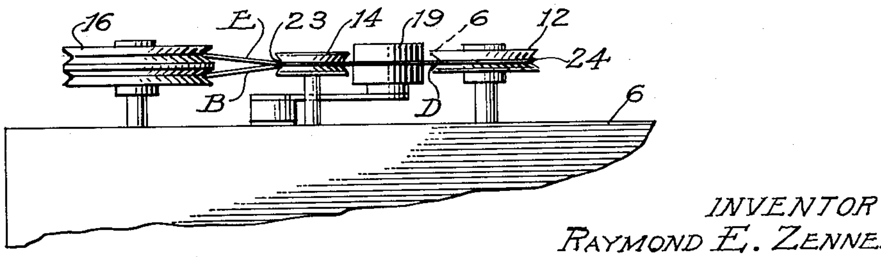

Another important element in the path is spool 14, which preferably is an idler spool used primarily to steady or produce a straight-line motion in the wire as it passes through the recording head. The action of spool 14 is illustrated in Fig. 3, where it may be seen that this spool is provided with a single V-shaped groove 23 which, in operation, is disposed in alignment with or in the plane of the pass through recording head 19. Also, capstan 12 mounts a spool having a single groove, or wire-engaging surface 24, and this groove lies in the plane of groove 23 and the recording head. As a result, the oscillatory motion produced by level wind spool 16 and illustrated in Fig. 3 is "ironed out" upon being engaged by idler spool 14 and a straight-line motion maintained past the recording head due to the alignment of the grooves of this idler, the recording head and capstan 12. In many other recorder paths this oscillatory movement remains in the wire as it enters the head to produce undesirable sound interferences or poor fidelity. In the present path, the support afforded to the recording medium insures a minimum of "flutter" or "wow" that sometimes adversely affects the operating characteristics of the recorder.

The use of idler spool or pulley 14 also enables legs B and E of the path to be crossed between it and the level wind pulley, thereby providing an increased bight around the latter pulley to reduce the likelihood of slippage as the recording medium drives the level wind mechanism. Finally, the idler pulley spaces the legs C and D between which recording head 19 is located, and, when the idler pulley is constructed of the same diameter as the capstan, these legs are substantially parallel, a fact which also may minimize any slippage of the recording medium.

As the recording medium is driven along its path at a constant speed by capstan 12, it is desirable to reduce the load of the moving parts on the fine recording medium, and also to provide a means to regulate the tension. An even tension on the recording medium in both directions of movement is achieved by identical spool control assemblies 26 for supply spool 8 and take-up spool 10. Each control assembly is provided with a driving coupling and a drag coupling, which couplings operate alternately, depending on whether the particular spool is driving or being driven, and such action is considered a desirable component of the present invention, even though the specific mechanism producing it can be formed as desired. The illustrated mechanism of Fig. 2 has been found most suitable and it will be discussed with reference to supply spool 8, since the mechanism for take-up spool 10 is identical with that of spool 8.

Supply spool 8 is releasably supported on a hub 28 driven by a shaft 30 connected to a source of power through a ratchet and friction clutch, presently to be described. Shaft 30 extends inwardly through panel 6 and supports a sleeve 32 on which is formed a shoulder 34, the sleeve being locked to the shaft by set screw 36. On the periphery of sleeve 32 is supported a freely rotatable ratchet wheel 40 having a knurled periphery and provided with a pressure washer 42 forming an annular recess in which is rotatably supported a pulley 44, which may be belt-driven by the same prime mover that turns capstan 12. The supply spool is driven during a rewind operation (counterclockwise rotation of spools) through a driving coupling which is effected by a moving pawl 46 pivotally mounted on pulley 44 which pawl 46 engages the knurling with the assistance of pawl spring 47 and drives the ratchet wheel. The ratchet wheel is in turn frictionally connected to shaft 30 through felt washers 48 and 50 positioned on the outer sides of the ratchet wheel and its washer 42. The felt washers form a clutch that may be adjusted in slippage by a pressure washer 51 acting on a spring assembly 52. It is the clutch in the particular spool assembly receiving the recording medium that determines the tension, and in practice, a tension of between 2 or 3 ounces on the recording medium has been found satisfactory, and it permits pulley 44 to be overdriven approximately 25% with respect to supply spool 8 or take-up spool 10.

As supply spool 8 is driven in a rewind direction (counterclockwise) a drag coupling in the take-up spool 10 provides the necessary resistance in the recording medium to control the unwinding of the medium from the take-up spool. Since the control assemblies for spools 8 and 10 are identical, as previously stated, the drag mechanism in take-up spool 10 will be described with reference to the same type of coupling that is present in spool 8, and comprises a collar 54 provided with a fixed pawl 56 that engages the ratchet wheel of take-up spool 10 by the assistance of a fixed pawl spring 58.

Thus, as supply spool 8 is being driven through its driving coupling in a rewind direction (counter-clockwise) as described above, its fixed pawl is free of its ratchet wheel, whereas the counterpart fixed pawl in the take-up spool assembly engages its corresponding ratchet wheel to furnish the resistance at the other end of the medium as it is being unwound. On the other hand, when take-up spool 10 is driven in a recording or forward direction (clockwise), as is illustrated by the arrows in Fig. 1, the reverse condition takes place; that is, the take-up spool is the driving spool through its counterpart driving mechanism, while the driving coupling for supply spool 8 is inoperative and the drag mechanism in the supply spool mechanism is operative to provide the necessary resistance. Accordingly, the operation of the driving coupling for one spool is thus coordinated with the operation of the drag coupling for the other spool.

By the use of the invention, a novel path is provided with lateral clearance for the sound recording medium enabling the operator as he faces the panel to thread the machine with one hand in a simple and continuous movement. The moving parts of the path are symmetrically arranged so that the recording medium always is under a constant tension which is necessary to obtain the highest quality of recording performance. This result is achieved partly by the incorporation of a freely rotatable level wind pulley in the path. The level wind pulley is positioned in the path centrally and offset with respect to the supply and take-up spools to serve each spool in the same capacity, thus avoiding duplication of equipment, and for this reason the level wind pulley is supplied with two sheaves, one for each spool. The symmetrical and compact arrangement of the path is fully achieved by positioning the capstan in an opposite and aligned position to the level wind pulley with the idler pulley in an intermediate position. The supply and take-up spools are rotated in the same direction for each operation, which permits the recording medium to be taken off the bottom and top of the upper and lower spools, respectively, permitting a more compact path and increasing the bight around the level wind pulley without the necessity of expanding the arrangement of parts.

The level wind mechanism acting in a similar manner as a fly wheel furnishes a drag on the recording medium which, however, is only incidental to the drag mechanism provided in the spool assemblies. Each spool assembly is provided with a driving coupling and a drag coupling, the former mechanism operating when the recording medium is being added to the driving spool and the latter mechanism operating on the spool being unwound. The amount of tension on the recording medium may be controlled by a friction clutch associated with each driving coupling. In addition to these many advantages, a smooth, unvarying motion of the wire as it passes the recording head is assured by the provision of idler 14 and, as a consequence, interferences are reduced to minimum.

Obviously many modifications and variations of the present invention are possible in the light of the above teachings. It is, therefore, to be understood that within the scope of the appended claims the invention may be practiced otherwise than as specifically described.

I claim:

1. Recording apparatus for guiding recording medium in a fixed path from a supply reel past a recording head and to a take-up reel, said apparatus including a reciprocating level-wind spool for receiving said medium from said reel and delivering it to said take-up reel, an idler disposed between said level-wind and said head, and another driven spool disposed between said head and said idler, said idler and other driven spool each being formed with a groove disposed in alignment with the pass through said head, said driven spool engaging said medium after passage through said head and said idler being positioned to have a limited arcuate portion of its groove engage said recording medium during its travel to said head and to have another limited arcuate portion again engage the medium during its return travel from the head, whereby said idler and driven spool maintain a straight-line pass of said medium through said head, said level-wind spool being reciprocably driven by said medium travel and said portions of the medium traveling between said idler and said level-wind spools crossing one another for reducing slippage about the level-wind spool.

2. Recording apparatus for guiding recording medium in a fixed path from a supply reel past a recording head and to a take-up reel, said apparatus including a reciprocating level-wind spool for receiving said medium from said supply reel and delivering it to said take-up reel, and an idler disposed between said level-wind spool and said head, said idler being formed with a groove disposed in alignment with the pass through said head and having a limited arcuate portion of its groove engaging said recording medium during its travel to said head and a separate limited arcuate portion again engaging the medium during its return travel from the head, whereby said idler maintains a straight-line pass of said medium through said head, said level-wind spool being reciprocably driven by said medium travel and said portions of the medium traveling between said idler and said level-wind spool crossing one another for reducing slippage about the level-wind spool.

References Cited in the file of this patent

UNITED STATES PATENTS

| | | |
|---|---|---|
| 553,935 | Purdy | Feb. 4, 1896 |
| 1,632,875 | Bouvier | June 21, 1927 |
| 2,305,045 | Torrence | Dec. 15, 1942 |
| 2,372,810 | Camcas | Apr. 3, 1945 |
| 2,418,543 | Camcas | Apr. 8, 1947 |
| 2,526,051 | Shrader | Oct. 17, 1950 |
| 2,535,478 | Arndt, Jr. et al. | Dec. 26, 1950 |
| 2,578,023 | Shrader | Dec. 11, 1951 |